US008209359B2

(12) United States Patent
Behnen et al.

(10) Patent No.: US 8,209,359 B2
(45) Date of Patent: Jun. 26, 2012

(54) GENERATING BPEL CONTROL FLOWS

(75) Inventors: Marion Behnen, Austin, TX (US); James M. McArdle, Austin, TX (US); Gregg L. Snodgrass, Round Rock, TX (US); Hoi J. Yoo, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1165 days.

(21) Appl. No.: 11/868,472

(22) Filed: Oct. 6, 2007

(65) Prior Publication Data

US 2009/0094269 A1 Apr. 9, 2009

(51) Int. Cl.
 G06F 7/00 (2006.01)
 G06F 17/30 (2006.01)
(52) U.S. Cl. ............... 707/803; 707/793; 707/804
(58) Field of Classification Search .......... 707/802, 707/803, 804, 793
 See application file for complete search history.

(56) References Cited

U.S. PATENT DOCUMENTS

| 6,014,670 | A  | * | 1/2000  | Zamanian et al. ............ 1/1 |
| 6,167,405 | A  | * | 12/2000 | Rosensteel et al. ........... 1/1 |
| 6,850,952 | B2 | * | 2/2005  | Tse et al. .................... 1/1 |
| 2003/0033155 | A1 | * | 2/2003 | Peerson et al. ............. 705/1 |
| 2003/0217069 | A1 | * | 11/2003 | Fagin et al. ............. 707/102 |
| 2005/0086297 | A1 |   | 4/2005  | Hinks |
| 2005/0251527 | A1 | * | 11/2005 | Phillips et al. ........... 707/101 |
| 2005/0257098 | A1 |   | 11/2005 | Andrews et al. |
| 2005/0261918 | A1 |   | 11/2005 | Carr et al. |
| 2007/0074155 | A1 | * | 3/2007  | Ama et al. ............... 717/106 |
| 2007/0209041 | A1 | * | 9/2007  | Exley et al. ............. 719/328 |

OTHER PUBLICATIONS

Althoff, et al.; "Professional Knowledge Management"; Third Biennial Conference; Apr. 10-13, 2005; pp. 570-579; University of Dusseldorf; WU Vienna, Austria.
Ammuaykanjanasin, et al.; "The BPEL Orchestrating Framework for Secured Grid Services"; IEEE Computer Society; ITCC;05; 0-7695-2315-3/05; Chulalongkorn University; Bangkok, Thailand.
Chafle, et al.; "Decentralized Orchestration of Composite Web Services"; WWW2004; May 17-22, 2004; pp. 134-143; ACM 1-58113-912-8/4/0005; New York, NY.
Charfi, et al.; "Hybrid Web Service Composition: Business Processes Meet Business Rules"; Darmstadt University of Technology; Nov. 15-19, 2004; 1-58113-871-7/04/0011; pp. 41-49; New York, NY.
Li, et al.; "Document Clustering Via Adaptive Subspace Iteration"; SIGIR'04; Jul. 25-29, 2004; 1-58113-881-4/04/0007; ACM; Sheffield, South Yorkshire, UK.
Nanda, et al.; "Decentralizing Execution of Composite Web Services"; OOPSLA'04; Oct. 24-28, 2004; 1-58113-831-08/04/0010; ACM; Vancouver, British Columbia, Canada.
Van Der Aalst, et al.; "Business Process Management"; 3rd International Conference; Sep. 5-8, 2005; pp. 64-79; Vienna University of Technology; Wien, Austria.

* cited by examiner

*Primary Examiner* — Fred I Ehichioya
*Assistant Examiner* — Sabana Rahman
(74) *Attorney, Agent, or Firm* — DeLizio Gilliam, PLLC (57) ABSTRACT

Generating Business Process Execution Language ('BPEL') control flows to populate a data warehouse for analysis of data of an operational system including identifying source tables in the operational system and one or more corresponding target tables in the data warehouse; creating BPEL steps to represent links between each source table in the operational system and each corresponding target table in the data warehouse; determining a sequence for the BPEL step; and adding the BPEL steps to a BPEL control flow according to the determined sequence.

15 Claims, 5 Drawing Sheets

GENERATING BPEL CONTROL FLOWS

BACKGROUND OF THE INVENTION

1. Field of the Invention

The field of the invention is data processing, or, more specifically, methods, apparatus, and products for generating Business Process Execution Language ('BPEL') control flows.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Modern businesses rely on database technology to track critical business information. This information is often spread across many database systems. The information may, in any business activity, be modified, moved, or otherwise used. To increase efficiency in business activities, a business may from time to time examine the information in the database system. To analyze information without increasing the strain on the database system used for typical business activities, the information may be extracted, transformed, and loaded ('ETL') into an external system, called a data warehouse, where it is analyzed. Each ETL dataflow from the database system to the data warehouse may be a database application program, a Sequenced Query Language script, or a batch script. ETL performed on any database system may include many discrete ETL dataflows. Currently, creating a single control flow to represent the combination of many ETL dataflows is a tedious, manual, error-prone, and time-consuming task.

SUMMARY OF THE INVENTION

Methods, apparatus, and products for generating Business Process Execution Language ('BPEL') control flows to populate a data warehouse for analysis of data of an operational system are disclosed that include identifying source tables in the operational system and one or more corresponding target tables in the data warehouse; creating BPEL steps to represent links between each source table in the operational system and each corresponding target table in the data warehouse; determining a sequence for the BPEL step; and adding the BPEL steps to a BPEL control flow according to the determined sequence.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
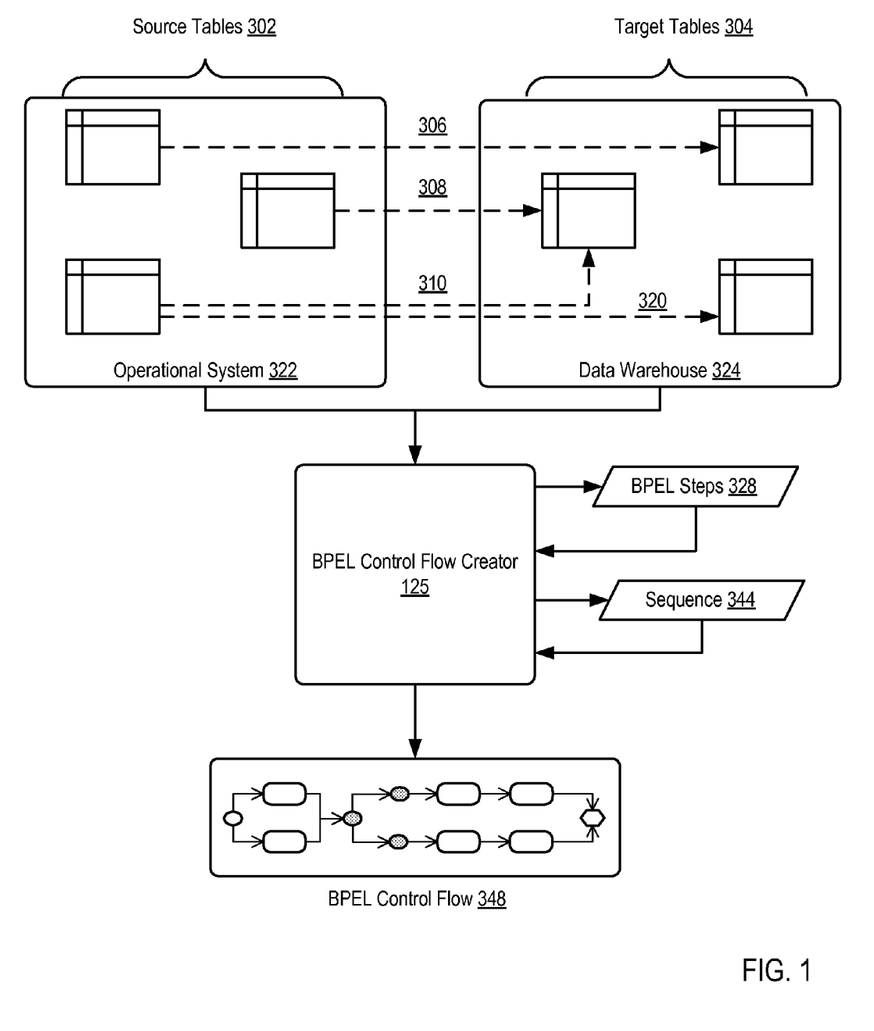
FIG. 1 sets forth a block diagram of an exemplary system that operates generally for generating BPEL control flows to populate a data warehouse for analysis of data of an operational system according to embodiments of the present invention.

Exemplary methods, apparatus, and products for generating BPEL control flows in accordance with the present invention are described with reference to the accompanying drawings, beginning with FIG. 1. FIG. 1 sets forth a block diagram of an exemplary system that operates generally for generating BPEL control flows to populate a data warehouse for analysis of data of an operational system according to embodiments of the present invention.

The system of FIG. 1 includes an operational system (322). An operational system is a system that includes data that is used, transformed, or moved, during typical activities of a business. An operational system may include any number of data structures, such as for example, databases that include tables. Databases in an operational system may be organized according to any number of database models including, relational, hierarchical, network or other models as will occur to those of skill in the art.

Businesses may analyze data in the operational system (322) to increase efficiency of the operational system (322). To analyze the data without increasing the strain on the operational system caused by examining the data in the operational system, the data is transferred to an external system, a data warehouse. A data warehouse is a repository of a historical data. Data in a data warehouse is typically:

subject-oriented, in that the data relating to the same real-world event or object is linked together;

time-variant, in that the changes to the data in the database are tracked and recorded so that reports can be produced showing changes over time;

non-volatile, in that the data is typically not over-written or deleted; and integrated, in that the data warehouse contains data from most or all organization's operational activities.

The process of populating such a data warehouse is typically described as ETL—Extract, Transform, and Load. ETL is a process that involves extracting data from sources, transforming the data, and loading the data into the data warehouse.

The operational system (322) of FIG. 1 includes several source tables (302). A source table is a table in the operational system that contains data that is extracted from the operational system, transformed, and loaded into a data warehouse (324) for analysis. The data warehouse (324) of FIG. 1 includes several target tables (304). A target table is a table in which data from a source table in the operational system is loaded. When data is loaded into the target table the data may be analyzed.

The system of FIG. 1 also includes several links (306, 308, and 310). Each link represents an ETL action, that is, an extraction, transformation, and loading of data during the population of a data warehouse. A link may represent, for example, that during population of a data warehouse, a column in a source table is copied and loaded into a target table in the data warehouse. A link may also represent, for example, that during population of a data warehouse, a particular record of source table is extracted, summed with another record from another source table, and loaded into a target table in the data warehouse.

As mentioned above the system of FIG. 1 operates generally for generating BPEL control flows to populate a data warehouse for analysis of data of an operational system according to embodiments of the present invention. Business Process Execution Language ('BPEL') is based upon extensible markup language ('XML') and is used for the formal specification of business processes and business interaction protocols. A BPEL control flow is a representation of one or more businesses processes that includes a set of sequenced BPEL activities that are carried out during the execution of the one or more business processes.

The system of FIG. 1 includes a BPEL control flow creator (125), a module of computer program instructions. The exemplary BPEL control flow creator (125) of FIG. 1 is capable of identifying source tables (302) in the operational system (322) and one or more corresponding target tables (304) in the data warehouse. The exemplary BPEL control flow creator (125) of FIG. 1 is also capable of creating BPEL steps (328) to represent links (306, 308, 310, 320) between each source table (302) in the operational system (322) and each corresponding target table (304) in the data warehouse (324). The exemplary BPEL control flow creator (125) of FIG. 1 is also capable of determining a sequence (344) for the BPEL steps including: determining relationships among source tables in the operational system; determining relationships among target tables in the data warehouse; and applying a BPEL policy that includes the relationships among source tables in the operational system and relationships among target tables in the data warehouse. The exemplary BPEL control flow creator (125) of FIG. 1 is also capable of adding the BPEL steps (328) to a BPEL control flow (348) according to the determined sequence (344).

Generating BPEL control flows in accordance with the present invention is generally implemented with computers, that is, with automated computing machinery. In the system of FIG. 1, for example, the operational system (322), data warehouse (324), and BPEL control flow creator (125) are implemented to some extent at least as computers. For further explanation, therefore, FIG. 2 sets forth a block diagram of automated computing machinery comprising an exemplary computer (152) useful in for generating BPEL control flows to populate a data warehouse for analysis of data of an operational system according to embodiments of the present invention. The computer (152) of FIG. 2 includes at least one computer processor (156) or 'CPU' as well as random access memory (168) ('RAM') which is connected through a high speed memory bus (166) and bus adapter (158) to processor (156) and to other components of the computer (152).

Figure 2:
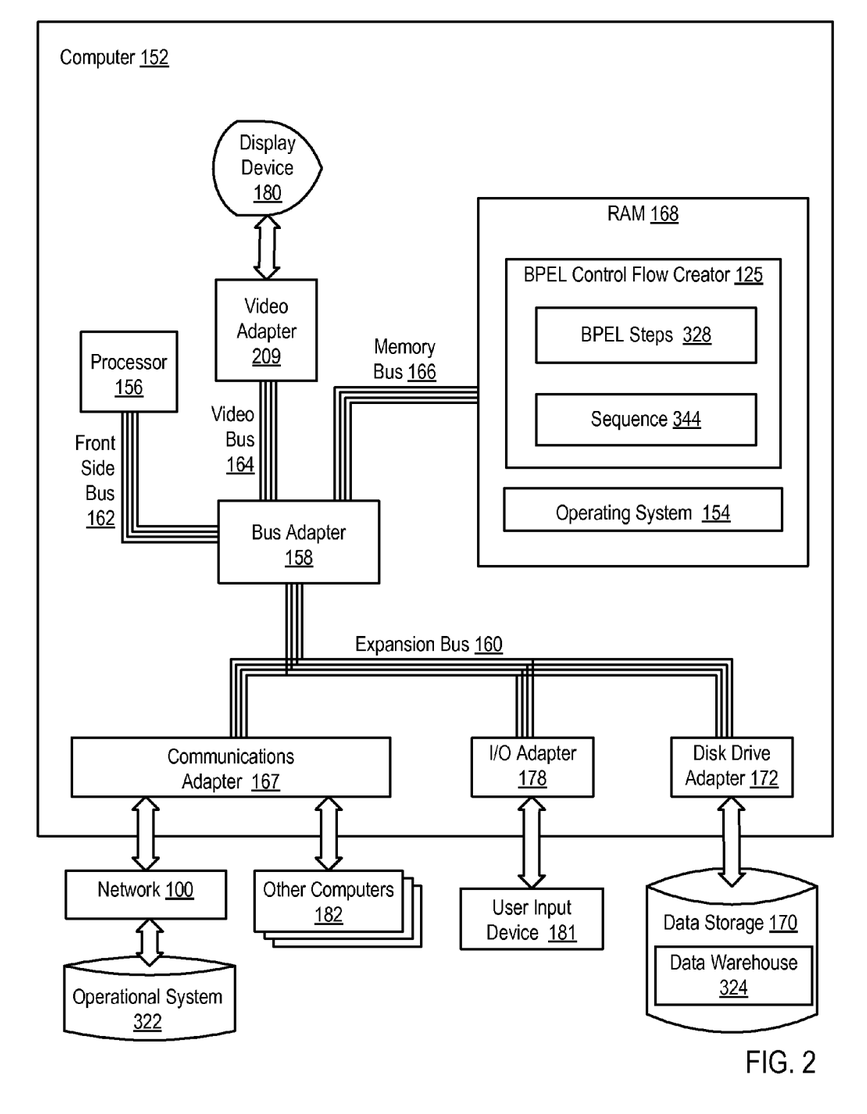
FIG. 2 sets forth a block diagram of automated computing machinery comprising an exemplary computer useful in for generating BPEL control flows to populate a data warehouse for analysis of data of an operational system according to embodiments of the present invention.

Stored in RAM (168) is a BPEL control flow creator (125), a module of computer program instructions improved for generating BPEL control flows according to embodiments of the present invention. The BPEL control flow creator (125) is capable of identifying source tables in the operational system (322) and one or more corresponding target tables in the data warehouse (324) and creating BPEL steps (328) to represent links between each source table in the operational system (322) and each corresponding target table in the data warehouse (324). The BPEL control flow creator (125) of FIG. 2 is also capable of determining a sequence (344) for the BPEL steps (328) including determining relationships among source tables in the operational system (322), determining relationships among target tables in the data warehouse (324), applying a BPEL policy that includes the relationships among source tables in the operational system and relationships among target tables in the data warehouse. The BPEL control flow creator (125) of FIG. 2 is also capable of adding the BPEL steps (328) to a BPEL control flow according to the determined sequence (344).

Also stored in RAM (168) is an operating system (154). Operating systems useful generating BPEL control flows according to embodiments of the present invention include UNIX™, Linux™, Microsoft XP™, AIX™, IBM's i5/OS™, and others as will occur to those of skill in the art. The operating system (154), BPEL control flow creator (125), BEP steps (328), and sequence (344) in the example of FIG. 2 are shown in RAM (168), but many components of such software typically are stored in non-volatile memory also, such as, for example, on a disk drive (170).

The computer (152) of FIG. 2 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for generating BPEL control flows according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 2 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 2 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for generating BPEL control flows according to embodiments of the present invention include modems for wired dial-up communications, Ethernet (IEEE 802.3) adapters for wired data communications network communications, and 802.11 adapters for wireless data communications network communications.

Figure 3:
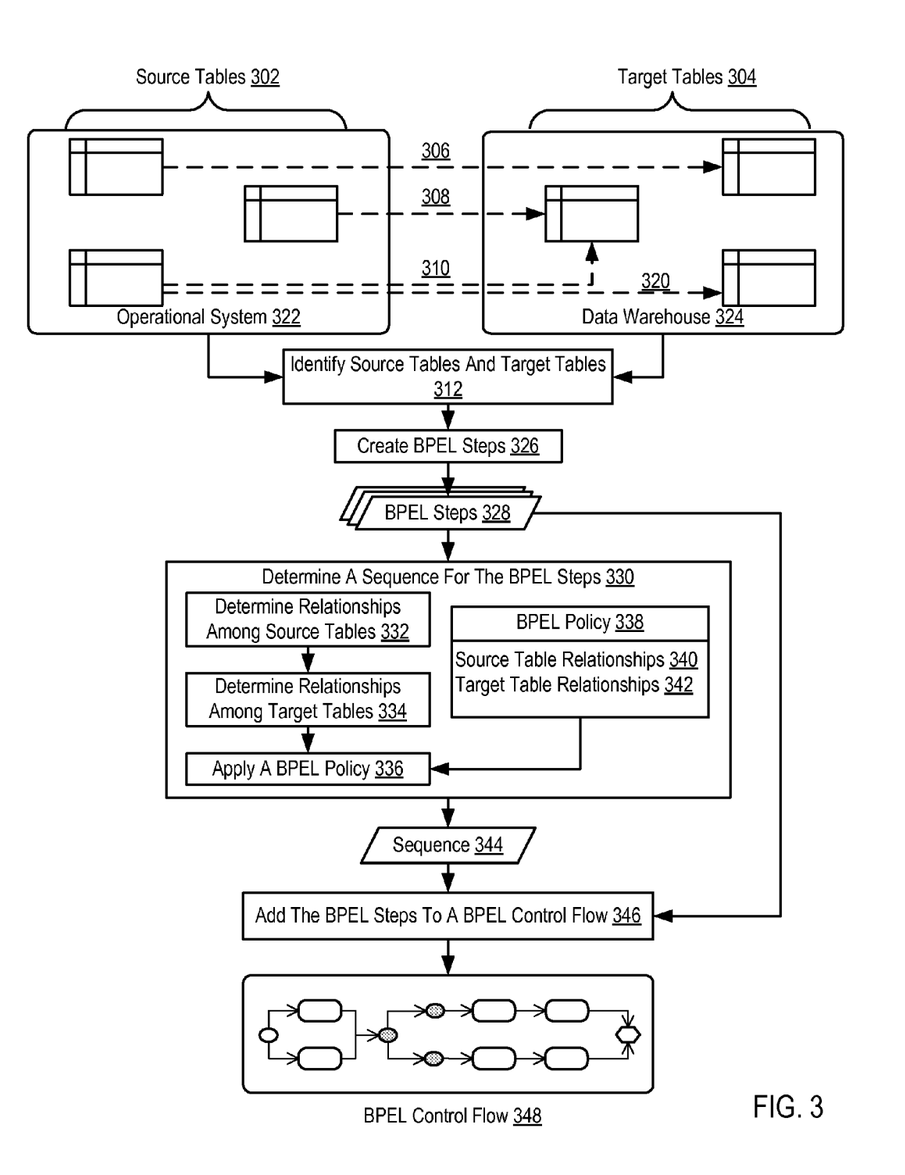
FIG. 3 sets forth a flow chart illustrating an exemplary method for generating BPEL control flows to populate a data warehouse for analysis of data of an operational system according to embodiments of the present invention.

For further explanation, FIG. 3 sets forth a flow chart illustrating an exemplary method for generating BPEL control flows to populate a data warehouse for analysis of data of an operational system according to embodiments of the present invention. The method of FIG. 3 includes identifying (312) source tables (302) in the operational system (322) and one or more corresponding target tables (304) in the data warehouse (324). Identifying (312) source tables (302) in the operational system (322) and one or more corresponding target tables (304) may be carried out by inferring, from actions specified in an Extraction, Transformation, and Load ('ETL') control flow, source tables in the operational system and one or more corresponding target tables in the data warehouse. Existing operational systems may have ETL control flows associated with the system such that upon implementation of the present invention, the ETL control flows may be used to identify source and target tables. Identifying (312) source tables (302) in the operational system (322) and one or more corresponding target tables (304) may also be carried out by retrieving metadata that describes the source and target tables or receiving a specification of the source and target tables from a system administrator.

The method of FIG. 3 also includes creating (326) BPEL steps (328) to represent links (306, 308, 310, 320) between each source table (302) in the operational system (322) and each corresponding target table (304) in the data warehouse (324). A BPEL step is a place holder for a user assigned BPEL action. A BPEL action may include an ETL specific activity, a call to a Web service, or some other action useful in populating a data warehouse for analysis.

Creating (326) BPEL steps (328) to represent links (306, 308, 310, 320) between each source table (302) in the operational system (322) and each corresponding target table (304) in the data warehouse (324) may be carried out by implementing a placeholder associated with an identification of the target and source table connected by the link. A placeholder may be implemented as an element in an XML markup document. Consider for example, the following exemplary XML pseudocode:

```
<step id = "129309">
    <sourceTable id = "OperationalSystem\CustomerInfo">
        <column id = "CustomerName">
        </column>
    </sourceTable >
    <targetTable id = "DataWarehouse\CustomerInfo">
        <column id = "CustomerName">
        </column>
    </targetTable>
</step>
```

The exemplary XML above includes a <step> tag. The <step> tag identifies a placeholder for a user assigned BPEL action. The <step> tag above identifies the BPEL step as step number 129309. The step number is a number that uniquely identifies a BPEL step. In this example the step number does not identify the sequence in which the BPEL step is executed in a BPEL control flow.

The exemplary XML above also includes a <sourceTable> tag. The <sourceTable> tag identifies the source table from which data is extracted during population of the data warehouse. In this example, the source table is identified as OperationalSystem\CustomerInfo.

The exemplary XML above also includes a <column> tag. The <column> tag identifies the column of data that is to be extracted from the source table during population of the data warehouse. In this example, the column of data that is to be extracted from the source table is the "CustomerName" column.

The exemplary XML above also includes a <targetTable> tag. The <targetTable> tag identifies the target table that is loaded during population of the data warehouse. In this example, the target table is identified as DataWarehouse\CustomerInfo.

The exemplary XML above also includes a <column> tag for the target table. The <column> tag identifies the column of data in the target table that is to be loaded during population of the data warehouse. In this example, the column of data that is to be loaded during population of the data warehouse is the "CustomerName" column in the target table.

The method of FIG. 3 also includes determining (320) a sequence (344) for the BPEL steps (328). In the method of FIG. 3, determining (320) a sequence (344) for the BPEL steps (328) is carried out by determining (332) relationships among source tables (302) in the operational system (322); determining (334) relationships among target tables (304) in the data warehouse (324); and applying (336) a BPEL policy (338) that includes the relationships (340) among source tables in the operational system (322) and relationships (342) among target tables in the data 5 warehouse. During the population of a data warehouse for analysis of data in an operational system, the order of ETL actions is highly dependent upon the relationship among tables in the operational system 322 and data warehouse 324.

Determining (332) relationships among source tables (302) in the operational system (322) may be carried out by retrieving metadata describing the source tables in the operational system. Such metadata may explicitly describe the relationships among the source tables. Determining (332) relationships among source tables (302) in the operational system (322) may also include inferring the relationships from the operational system. Relationships among tables may be inferred by creating a profile of the system. Database profiling tools create a profile of a database by identifying foreign and primary keys, foreign and primary tables, identifying a database schema that defines the structure of the database, monitoring movement, insertion, deletion, and transformation of data within the database, identifying names of tables in the database, and in other ways as will occur to those of skill in the art.

Determining (334) relationships among target tables (304) in the data warehouse (324) may be carried out in a manner similar to that of determining relationships among source tables in the operational system. Determining (334) relationships among target tables (304) in the data warehouse (324) may be carried out by retrieving metadata describing the target tables in the data warehouse or by inferring the relationships from the data warehouse.

The method of FIG. 3 also includes adding (346) the BPEL steps (328) to a BPEL control flow (348) according to the determined sequence (344). Adding (346) the BPEL steps (328) to a BPEL control flow (348) according to the determined sequence (344) may be carried out by inserting the BPEL steps into a markup document according to the determined sequence. Consider, for example, the following exemplary XML code:

```
<flow name= "PreControlFlowExample">
    <step id = "129309">
        <sourceTable id="OperationalSystem\CustomerInfo">
        </sourceTable>
        <targetTable id = "DataWarehouse\CustomerInfo">
        </targetTable>
    </step>
    <step id = "129420">
        <sourceTable id = "OperationalSystem\ProductInfo">
        </sourceTable >
        <targetTable id = "DataWarehouse\ProductInfo"></targetTable>
    </step>
</flow>
```

This exemplary XML is an example of a pre-BPEL control flow having several steps in a determined sequence which may be converted into a BPEL control flow. As explained above, a BPEL step is not a BPEL action that may be carried out, but instead is a placeholder for such an action. To convert the exemplary pre-BPEL control flow to a BPEL control flow, a user may assign specific BPEL actions for each step. BPEL actions may include an ETL specific activity, a call to a Web service, or some other action useful in populating a data warehouse for analysis.

The exemplary XML above includes a <flow> tag that identifies the pre-BPEL control flow. In this example the <flow> tag has a name attribute identifying the control flow as, "PreControlFlowExample."

The exemplary XML above also includes a <step> tag having an identification of 129309. In this example, step 129309 is the first BPEL step in the determined sequence of BPEL steps for the exemplary pre-BPEL control flow. This exemplary step includes a <sourceTable> tag that identifies the source table from which data is extracted during population of a data warehouse. In this example, the source table is identified as OperationalSystem\CustomerInfo. This exemplary step also includes a <targetTable> tag that identifies the target table that is loaded during population of the data warehouse. In this example, the target table is identified as DataWarehouse\CustomerInfo.

The exemplary XML above also includes a <step> tag having an identification of 129420. In this example, step 129420 is the second BPEL step in the determined sequence of BPEL steps for the exemplary pre-BPEL control flow. This exemplary step includes a <sourceTable> tag that identifies the source table from which data is extracted during population of a data warehouse. In this example, the source table is identified as OperationalSystem\ProductInfo. This exemplary step also includes a <targetTable> tag that identifies the target table that is loaded during population of the data warehouse. In this example, the target table is identified as DataWarehouse\ProductInfo.

Figure 4:
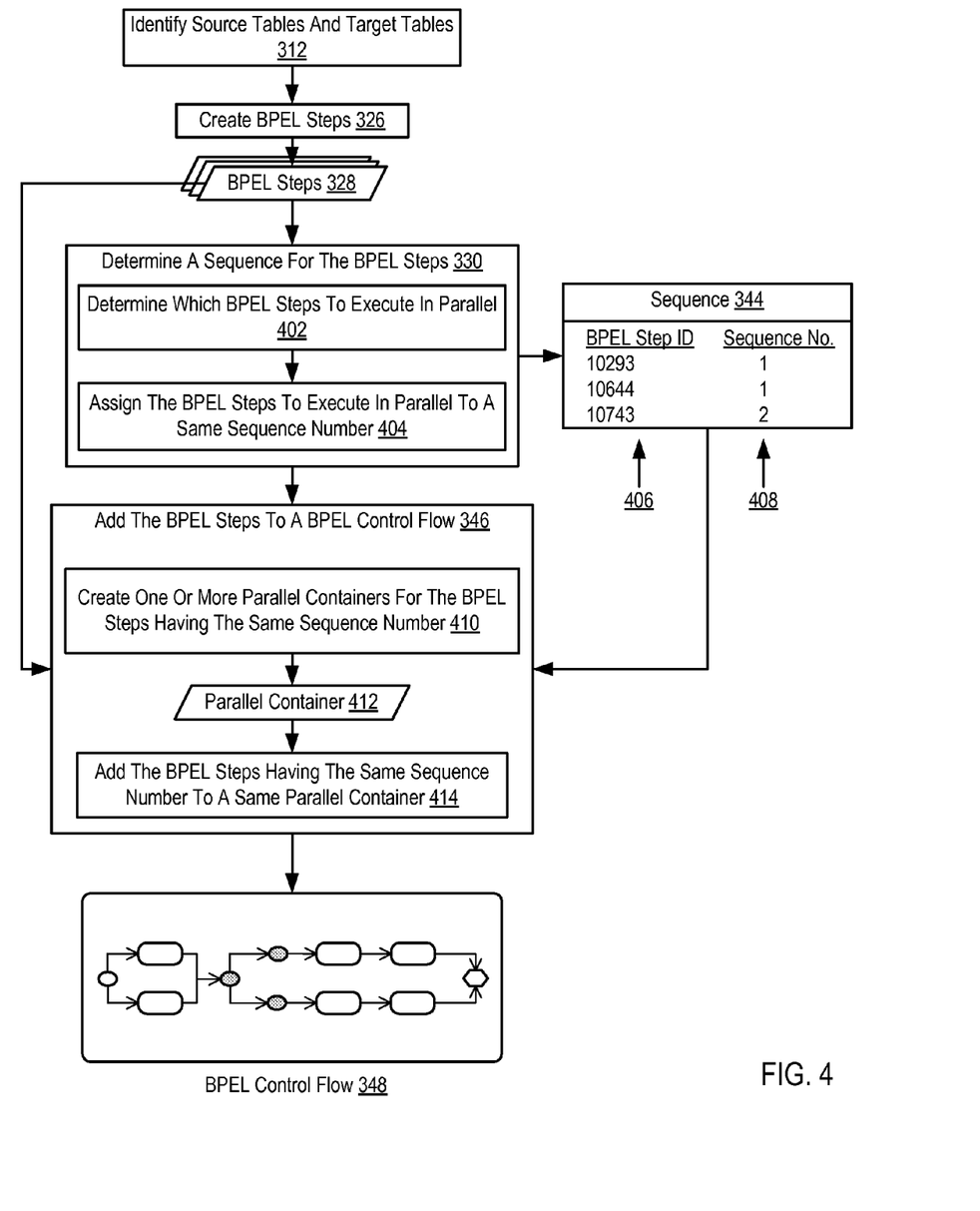
FIG. 4 sets forth a flow chart illustrating a further exemplary method for generating BPEL control flows to populate a data warehouse for analysis of data of an operational system according to embodiments of the present invention.

For further explanation, FIG. 4 sets forth a flow chart illustrating a further exemplary method for generating BPEL control flows to populate a data warehouse for analysis of data of an operational system according to embodiments of the present invention. The method of FIG. 4 is similar to the method of FIG. 3 in that the method of FIG. 4 includes identifying (312) source tables (302) in the operational system (322) and one or more corresponding target tables (304) in the data warehouse (324); creating (326) BPEL steps (328) to represent links (306, 308, 310, 320) between each source table (302) in the operational system (322) and each corresponding target table (304) in the data warehouse (324); determining (320) a sequence (344) for the BPEL steps (328); and adding (346) the BPEL steps (328) to a BPEL control flow (348) according to the determined sequence (344).

The method of FIG. 4 differs from the method of FIG. 3, however, in that, in the method of FIG. 4 determining (320) a sequence (344) for the BPEL steps (328) includes determining (402) which BPEL steps (328) to execute in parallel and assigning (404) the BPEL steps (328) to execute in parallel to a same sequence number (408). Assigning (404) the BPEL steps (328) to execute in parallel to a same sequence number (408) may be carried out by associating an identification of each BPEL step with a sequence number. In the method of FIG. 4, for example, the sequence (344) is represented as a table that associates BPEL step identifications (406) and sequence numbers (408). The column representing BPEL step identifications (406) includes three BPEL steps identified as 10293, 10644, and 10743. The column representing sequence numbers (408) includes a sequence number (408) for each BPEL step identification. The sequence number associated with the BPEL step identification 10293 is 1, the sequence number associated with the BPEL step identification 10644 is 1, and the sequence number associated with the BPEL step identification 10743 is 2. BPEL steps having the same sequence number represent ETL actions that may be carried out in parallel during population of a data warehouse. In this example, steps 10644 and 10743 represent actions that may be carried out in parallel.

The method of FIG. 4 also differs from the method of FIG. 3 in that, in the method of FIG. 4 adding (346) the BPEL steps (328) to a BPEL control flow (348) according to the determined sequence (344) includes creating (410) one or more parallel containers (412) for the BPEL steps (328) having the same sequence number (408); and adding (414) the BPEL steps (328) having the same sequence number (408) to a same parallel container.

A parallel container is a portion of a BPEL control flow that represents actions that may be carried out in parallel during the population of the data warehouse. Creating (410) one or more parallel containers (412) for the BPEL steps (328) having the same sequence number (408) may be carried out by creating for each step having the same sequence number, a sequence element in a pre-BPEL control flow markup language document and adding (414) the BPEL steps (328) having the same sequence number (408) to a same parallel container may be carried out by inserting those BPEL steps with the same sequence number into their corresponding sequence elements in the pre-BPEL control flow. Consider as an example, the following XML code:

```
<flow>
    <sequence>
        <step id = "129309"> </step>
        <sequence>
            <step id = "10103"> </step>
        </sequence>
        <sequence>
            <step id = "10104"></step>
            <step id = "10250"></step>
        </sequence>
    </sequence>
    <sequence>
        <step id = "129420"></step>
    </sequence>
</flow>
```

This exemplary XML is an example of a pre-BPEL control flow having several parallel steps which may be converted into a BPEL control flow. As explained above, a BPEL step is not a BPEL action that may be carried out, but instead is a placeholder for such an action. To convert the exemplary pre-BPEL control flow to a BPEL control flow, a user may assign specific BPEL actions for each step. BPEL actions may include an ETL specific activity, a call to a Web service, or some other action useful in populating a data warehouse for analysis.

In the exemplary XML above the pre-BPEL control flow includes a <sequence> element that identifies parallel BPEL steps. BPEL steps included in sequence elements of the same hierarchical level in the pre-BPEL control flow are parallel BPEL steps. There are five BPEL steps represented in the exemplary XML above including steps 129309, 10103, 10104, 10250, 102940. Steps 129309 and 129420 are parallel BPEL steps. Within step 129309 are three other BPEL steps. BPEL step 10103 is parallel to steps 10104 and 10250. Only steps having identification numbers are shown in the above example for clarity but readers of skill in the art will recognize that such a pre-BPEL control flow may also include other information such as, for example, target and source tables for each BPEL step.

Figure 5:
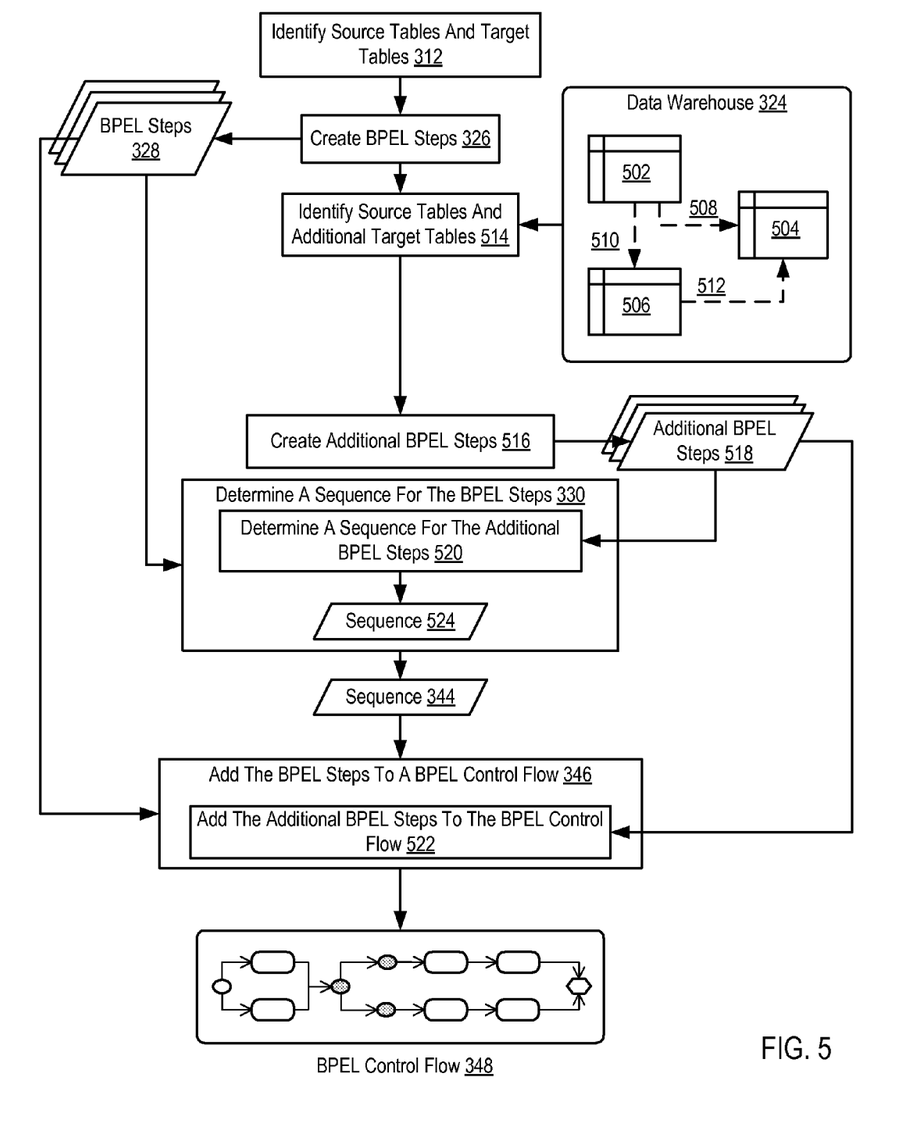
FIG. 5 sets forth a flow chart illustrating a further exemplary method for generating BPEL control flows to populate a data warehouse for analysis of data of an operational system according to embodiments of the present invention.

For further explanation, FIG. 5 sets forth a flow chart illustrating a further exemplary method for generating BPEL control flows to populate a data warehouse for analysis of data of an operational system according to embodiments of the present invention. The method of FIG. 5 is similar to the method of FIG. 3 in that the method of FIG. 5 includes identifying (312) source tables (302) in the operational system (322) and one or more corresponding target tables (304) in the data warehouse (324); creating (326) BPEL steps (328) to represent links (306, 308, 310, 320) between each source table (302) in the operational system (322) and each corresponding target table (304) in the data warehouse (324); determining (320) a sequence (344) for the BPEL steps (328); and adding (346) the BPEL steps (328) to a BPEL control flow (348) according to the determined sequence (344).

The method of FIG. 5 differs from the method of FIG. 3, however, in that the method of FIG. 5 includes identifying (514) source tables (502, 506) in the data warehouse (324) and one or more additional corresponding target tables (506, 504) in the data warehouse (324). From time to time during the population of a data warehouse for analysis of data in an operational system data already loaded into the data warehouse may be extracted, transformed, and loaded into other tables within the data warehouse. Identifying (514) source tables (502, 506) in the data warehouse (324) and one or more additional corresponding target tables (506, 504) in the data warehouse (324) may be carried out by inferring the source and target tables from actions specified in an ETL control flow, retrieving metadata that describes the source and target tables, or receiving a specification of the source and target tables from a system administrator.

The method of FIG. 5 also differs from the method of FIG. 3 in that the method of FIG. 5 includes creating (516) additional BPEL steps (518) to represent links (508, 510 512) between each source table (502, 506) in the data warehouse (324) and each additional corresponding target table (504) in the data warehouse. As mentioned above, creating a BPEL step may be carried out by implementing a placeholder associated with an identification of the target and source table connected by the link the BPEL step represents. A placeholder may be implemented as an element in an BPEL control flow markup document.

The method of FIG. 5 also differs from the method of FIG. 3 in that, in the method of FIG. 5 determining (330) a sequence (344) for the BPEL steps (328) includes determining (520) a sequence (524) for the additional BPEL steps (518), and adding (346) the BPEL steps (328) to the BPEL control flow (348) according to the determined sequence (344) includes adding (522) the additional BPEL steps (518) to the BPEL control flow (348) according to the determined sequence (524) for the additional BPEL steps (518). As mentioned above, adding BPEL steps to the BPEL control flow may be carried out by inserting the BPEL steps into a markup document according to the determined sequence.

Exemplary embodiments of the present invention are described largely in the context of a fully functional computer system for generating BPEL control flows. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for generating Business Process Execution Language ('BPEL') control flows to populate a data warehouse for analysis of data of an operational system, the method comprising:

identifying source tables in the operational system and one or more corresponding target tables in the data warehouse;

creating BPEL steps to represent links between each source table in the operational system and each corresponding target table in the data warehouse;

determining a sequence for the BPEL steps including:
determining which BPEL steps to execute in parallel and assigning the BPEL steps to execute in parallel to a same sequence number;
determining relationships among source tables in the operational system;
determining relationships among target tables in the data warehouse; and
applying a BPEL policy that includes the relationships among source tables in the operational system and relationships among target tables in the data warehouse;

and adding the BPEL steps to a BPEL control flow according to the determined sequence, wherein: the method further comprises identifying source tables in the data warehouse and one or more additional corresponding target tables in the data warehouse;
the method further comprises creating additional BPEL steps to represent links between each source table in the data warehouse and each additional corresponding target table in the data warehouse;
determining a sequence for the BPEL steps further comprises determining a sequence for the additional BPEL steps; and
adding the BPEL steps to the BPEL control flow according to the determined sequence further comprises adding the additional BPEL steps to the BPEL control flow according to the determined sequence for the additional BPEL steps.

2. The method of claim 1 wherein:
adding the BPEL steps to the BPEL control flow according to the determined sequence further comprises:
creating one or more parallel containers for the BPEL steps having the same sequence number; and
adding the BPEL steps having the same sequence number to a same parallel container.

3. The method of claim 1 wherein:
determining relationships among source tables in the operational system further comprises retrieving metadata describing the source tables in the operational system; and
determining relationships among target tables in the data warehouse further comprises retrieving metadata describing the target tables in the data warehouse.

4. The method of claim 1 wherein:
determining relationships among source tables in the operational system further comprises inferring the relationships from the operational system; and
determining relationships among target tables in the data warehouse further comprises inferring the relationships from the data warehouse.

5. The method of claim 1 wherein identifying source tables in the operational system and one or more corresponding target tables in the data warehouse further comprises:
inferring, from actions specified in an Extraction, Transformation, and Load ('ETL') control flow, source tables in the operational system and one or more corresponding target tables in the data warehouse.

6. An apparatus for generating Business Process Execution Language ('BPEL') control flows to populate a data warehouse for analysis of data of an operational system, the apparatus comprising a computer processor, a computer memory operatively coupled to the computer processor, the computer memory having disposed within it computer program instructions that when executed by the computer processor cause the computer processor to:
identify source tables in the operational system and one or more corresponding target tables in the data warehouse;
create BPEL steps to represent links between each source table in the operational system and each corresponding target table in the data warehouse;
determine a sequence for the BPEL steps including:
determine which BPEL steps to execute in parallel and assigning the BPEL steps to execute in parallel to a same sequence number;
determine relationships among source tables in the operational system;
determine relationships among target tables in the data warehouse; and
apply a BPEL policy that includes the relationships among source tables in the operational system and relationships among target tables in the data warehouse; and
add the BPEL steps to a BPEL control flow according to the determined sequence, wherein: the method further comprises identifying source tables in the data warehouse and one or more additional corresponding target tables in the data warehouse; the method further comprises creating additional BPEL steps to represent links between each source table in the data warehouse and each additional corresponding target table in the data warehouse; determining a sequence for the BPEL steps further comprises determining a sequence for the additional BPEL steps; and adding the BPEL steps to the BPEL control flow according to the determined sequence further comprises adding the additional BPEL steps to the BPEL control flow according to the determined sequence for the additional BPEL steps.

7. The apparatus of claim 6 wherein:
the computer program instructions that when executed by the computer processor cause the computer processor to determine a sequence for the BPEL steps further comprises computer program instructions that when executed by the computer processor cause the computer processor to:
add the BPEL steps to the BPEL control flow according to the determined sequence further comprises:
create one or more parallel containers for the BPEL steps having the same sequence number; and
add the BPEL steps having the same sequence number to a same parallel container.

8. The apparatus of claim 6 wherein:
the computer program instructions that when executed by the computer processor cause the computer processor to determine relationships among source tables in the operational system further comprises computer program instructions that when executed by the computer processor cause the computer processor to retrieve metadata describing the source tables in the operational system; and
the computer program instructions that when executed by the computer processor cause the computer processor to determine relationships among target tables in the data warehouse further comprises computer program instructions that when executed by the computer processor cause the computer processor to retrieve metadata describing the target tables in the data warehouse.

9. The apparatus of claim 6 wherein:
the computer program instructions that when executed by the computer processor cause the computer processor to determine relationships among source tables in the operational system further comprises computer program instructions that when executed by the computer processor cause the computer processor to infer the relationships from the operational system; and
the computer program instructions that when executed by the computer processor cause the computer processor to determine relationships among target tables in the data warehouse further comprises computer program instructions that when executed by the computer processor cause the computer processor to infer the relationships from the data warehouse.

10. The apparatus of claim 6 wherein the computer program instructions that when executed by the computer processor cause the computer processor to identify source tables in the operational system and one or more corresponding target tables in the data warehouse further comprises:
computer program instructions that when executed by the computer processor cause the computer processor to infer, from actions specified in an Extraction, Transformation, and Load ('ETL') control flow, source tables in the operational system and one or more corresponding target tables in the data warehouse.

11. A computer program product for generating Business Process Execution Language ('BPEL') control flows to populate a data warehouse for analysis of data of an operational system, the computer program product comprising:
a computer readable, recordable, non-transmission medium having computer readable program code embodied therewith, the computer readable program code comprising: computer readable program code configured to identify source tables in the operational system and one or more corresponding target tables in the data warehouse;
computer readable program code configured to create BPEL steps to represent links between each source table in the operational system and each corresponding target table in the data warehouse;
computer readable program code configured to determine a sequence for the BPEL steps including:
computer readable program code configured to determine which BPEL steps to execute in parallel and assigning the BPEL steps to execute in parallel to a same sequence number;
computer readable program code configured to determine relationships among source tables in the operational system;
computer readable program code configured to determine relationships among target tables in the data warehouse; and
computer readable program code configured to apply a BPEL policy that includes the relationships among source tables in the operational system and relationships among target tables in the data warehouse; and
computer readable program code configured to add the BPEL steps to a BPEL control flow according to the determined sequence, wherein: the method further comprises identifying source tables in the data warehouse and one or more additional corresponding target tables in the data warehouse; the method further comprises creating additional BPEL steps to represent links between each source table in the data warehouse and each additional corresponding target table in the data warehouse; determining a sequence for the BPEL steps further comprises determining a sequence for the additional BPEL steps; and adding the BPEL steps to the BPEL control flow according to the determined sequence further comprises adding the additional BPEL steps to the BPEL control flow according to the determined sequence for the additional BPEL steps.

12. The computer program product of claim 11 wherein:
the computer readable program code configured to determine a sequence for the BPEL steps further comprises:
computer readable program code configured to add the BPEL steps to the BPEL control flow according to the determined sequence further comprises:
computer readable program code configured to create one or more parallel containers for the BPEL steps having the same sequence number; and
computer readable program code configured to add the BPEL steps having the same sequence number to a same parallel container.

13. The computer program product of claim 11 wherein:
the computer readable program code configured to determine relationships among source tables in the operational system further comprises computer readable program code configured to retrieve metadata describing the source tables in the operational system; and the computer readable program code configured to determine relationships among target tables in the data warehouse further comprises computer readable program code configured to retrieve metadata describing the target tables in the data warehouse.

14. The computer program product of claim 11 wherein:
the computer readable program code configured to determine relationships among source tables in the operational system further comprises computer readable program code configured to infer the relationships from the operational system; and
the computer readable program code configured to determine relationships among target tables in the data warehouse further comprises computer readable program code configured to infer the relationships from the data warehouse.

15. The computer program product of claim 11 wherein the computer readable program code configured to identify source tables in the operational system and one or more corresponding target tables in the data warehouse further comprises:
computer readable program code configured to infer, from action specified in an Extraction, Transformation, and Load ('ETL') control flow, source tables in the operational system and one or more corresponding target tables in the data warehouse.

* * * * *